(12) United States Patent
Ying

(10) Patent No.: US 11,449,932 B2
(45) Date of Patent: Sep. 20, 2022

(54) DATA AUDITING METHOD AND DEVICE

(71) Applicant: Advanced New Technologies Co., Ltd., George Town (KY)

(72) Inventor: Pengfei Ying, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/395,832

(22) Filed: Aug. 6, 2021

(65) Prior Publication Data

US 2021/0366039 A1  Nov. 25, 2021

Related U.S. Application Data

(63) Continuation of application No. 17/034,939, filed on Sep. 28, 2020, now Pat. No. 11,087,398, which is a
(Continued)

(30) Foreign Application Priority Data

Oct. 23, 2017 (CN) .......................... 201710995706.X

(51) Int. Cl.
*G06Q 40/02* (2012.01)
*G06Q 30/06* (2012.01)
(Continued)

(52) U.S. Cl.
CPC ........... *G06Q 40/025* (2013.01); *G06F 16/86* (2019.01); *G06Q 30/0611* (2013.01);
(Continued)

(58) Field of Classification Search
CPC ...... G06Q 40/025; G06Q 40/12; G06Q 40/02; G06F 16/86; H04L 9/0637; H04L 2209/38
(Continued)

(56) References Cited

U.S. PATENT DOCUMENTS

| 5,193,162 A | 3/1993 | Bordsen et al. |
| 5,937,413 A | 8/1999 | Hyun et al. |

(Continued)

FOREIGN PATENT DOCUMENTS

| CA | 3012306 | 8/2017 |
| CN | 101022454 | 8/2007 |

(Continued)

OTHER PUBLICATIONS

[No Author], "The History of Accounting" University of South Australia, Dec. 2013.
(Continued)

*Primary Examiner* — Robert R Niquette
(74) *Attorney, Agent, or Firm* — Fish & Richardson P.C.

(57) ABSTRACT

A query request is forwarded to a plurality of service provider servers by a proxy server that determines a serial number based on the query request. An encrypted query result corresponding to the query request is received from each service provider server, and a copy of the encrypted query result is stored as a result to be audited in a blockchain that associated with each service provider server. An audit request is sent to at least one service provider server. The result to be audited is obtained from the blockchain corresponding to the service provider server. As a standard result, an encrypted query result is received from the service provider server. As an audit, the standard result received from the service provider server is compared with the result to be audited that obtained from the blockchain that associated with the service provider server.

20 Claims, 10 Drawing Sheets

Related U.S. Application Data continuation of application No. 16/721,363, filed on Dec. 19, 2019, now Pat. No. 10,789,644, which is a continuation of application No. 16/167,329, filed on Oct. 22, 2018, now Pat. No. 10,885,581.

(51) Int. Cl.
| | | |
|---|---|---|
| *G06Q 40/00* | (2012.01) | |
| *H04L 9/06* | (2006.01) | |
| *G06F 16/84* | (2019.01) | |
| *H04L 67/563* | (2022.01) | |
| *H04L 9/00* | (2022.01) | |

(52) U.S. Cl.
CPC .............. *G06Q 40/02* (2013.01); *G06Q 40/12* (2013.12); *H04L 9/0637* (2013.01); *H04L 67/563* (2022.05); *H04L 9/50* (2022.05)

(58) Field of Classification Search
USPC .................................................... 705/35–45
See application file for complete search history.

(56) References Cited

U.S. PATENT DOCUMENTS

| | | | |
|---|---|---|---|
| 6,317,783 | B1 | 11/2001 | Freishtat et al. |
| 7,725,728 | B2 | 5/2010 | Ama et al. |
| 8,706,592 | B2 | 4/2014 | Tealdi et al. |
| 10,789,644 | B2 | 9/2020 | Ying |
| 2003/0004865 | A1* | 1/2003 | Kinoshita ............ G06Q 40/025 705/42 |
| 2004/0133521 | A1* | 7/2004 | Hedy .................. G06Q 20/102 705/51 |
| 2005/0097149 | A1 | 5/2005 | Vaitzbift et al. |
| 2013/0031067 | A1 | 1/2013 | Iyer et al. |
| 2017/0264428 | A1 | 9/2017 | Seger, II |
| 2018/0260888 | A1 | 9/2018 | Paolini-Subramanya et al. |
| 2019/0087893 | A1* | 3/2019 | Pellew .................. G06Q 40/04 |
| 2019/0122296 | A1 | 4/2019 | Ying |
| 2019/0266146 | A1* | 8/2019 | Rose .................... G06F 16/215 |
| 2020/0126154 | A1 | 4/2020 | Ying |

FOREIGN PATENT DOCUMENTS

| | | |
|---|---|---|
| CN | 105608146 | 5/2016 |
| CN | 105871545 | 8/2016 |
| CN | 106611372 | 5/2017 |
| CN | 106936818 | 7/2017 |
| CN | 106952153 | 7/2017 |
| CN | 201732697 | 9/2017 |
| WO | WO 2005031522 | 4/2005 |
| WO | WO 2017145008 | 8/2017 |
| WO | WO 2017178956 | 10/2017 |

OTHER PUBLICATIONS

Fest, "Bank Consortium Demonstrates Leveraged Loan Trade Via Blockchain", American Banker, Apr. 2017.

International Search Report and Written Opinion in International Application No. PCT/US2018/057090, dated Feb. 12, 2019, 13 pages.

Ipreo [online], "Financial Institutions Move Closer to Realizing a Blockchain Solution for Syndicated Loans", Mar. 2017, retrieved from URL <https://ipreo.com/press-releases/financial-institutions-move-closer-to-realizing-a-blockchain-solution-for-syndicated-loans/.

Majumdar et al., "Impact of Distributed Ledger Technology on Syndicated Loans", Genpack White Paper, 2016.

PCT International Preliminary Report on Patentability in International Appln. No PCT/US2018/057090, dated Apr. 28, 2020, 7 pages.

Rutenberg et al., "Blockchain Technology: A syndicated Loan Revolution?", Polsinelli, Jul. 2017.

Wikipedia [online], "Blockchain", Oct. 2017, retrieved from URL <htttps://en.wikipedia.org/wiki/Blockchain.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

DATA AUDITING METHOD AND DEVICE

CROSS-REFERENCE TO RELATED APPLICATIONS

This application is a continuation of U.S. patent application Ser. No. 17/034,939, now allowed, filed on Sep. 28, 2020, which is a continuation of U.S. patent application Ser. No. 16/721,363, filed on Dec. 19, 2019, now U.S. Pat. No. 10,789,644, issued on Sep. 29, 2020, which is a continuation of U.S. patent application Ser. No. 16/167,329, filed on Oct. 22, 2018, now U.S. Pat. No. 10,885,581, issued on Jan. 5, 2021, which claims priority to Chinese Patent Application No. 201710995706.X, filed on Oct. 23, 2017, and each application is hereby incorporated by reference in its entirety.

TECHNICAL FIELD

The present application relates to the field of information technologies, and in particular, to a data auditing method and device.

BACKGROUND

As a supervising mechanism, auditing plays an important role in modern society. Currently, with the development of network technologies, more and more types of audit content emerge, for example, auditing a user's insurance status in an insurance company, auditing a user's loan status, and auditing a user's assets. As such, service providers can determine whether to provide a service for a user or determine the type of the service to be provided based on audit results.

In the existing technology, the open market leads to a plurality of service providers for the same type of service in the market. For the same type of service, a user can obtain the same kind of service from multiple service providers that provide the service. As such, the multiple service providers perform the same kind of service for the user, which called as a service of a multi-provider type.

The following uses a loan service as an example for description. In the existing technology, when a loan provided by a single lender cannot satisfy a user's needs, the user can further make a loan request to a plurality of lenders to obtain more loans, that is, multi-lender loans.

As such, any lender that provides a loan service needs to audit the user to evaluate the risk of the loan service before providing the service, and determine an amount of loans that can be provided for the user based on an amount of loans obtained by the user from other lenders (that is, an obtained audit result).

For example, if user a needs a loan of 1 million, because a loan (assumed to be 300,000) obtained by user a from bank b cannot satisfy needs of user a, user a can continue to initiate loan requests to bank c and bank d. In such case, bank c and bank d can audit user a, and determine whether to lend a loan to user a, and determine an amount of loans to be provided to user a based on an amount of loans obtained by user a from other banks.

However, because an amount of loans obtained by a user from a lender is privacy data of the lender, the lender usually does not want to provide the information to a third party (such as another user or another lender). In addition, to ensure security of the privacy data, the privacy data is usually stored only at the lender side. As such, it is difficult for a lender to obtain privacy data of another lender. In addition, even if the other lender provides the privacy data, the authenticity of the privacy data is difficult to verify.

The present specification provides a new data auditing method and device based on the existing technology.

SUMMARY

Implementations of the present specification provide a data auditing method and device, to resolve the following problem: In an existing multi-provider type service, because service data of a user at each service provider is privacy data of each service provider, it is difficult to audit the service of the multi-provider type, and consequently user experience is poor in the service of the multi-provider type, such as a multi-lender loan service.

The following technical solutions are used in the implementations of the present specification:

A data auditing method includes the following: sending a query request to several service provider devices when receiving the query request, so that each service provider device determines an encrypted query result that corresponds to the query request based on the query request, and stores the encrypted query result as a result to be audited in a blockchain; obtaining the result to be audited that is stored by each service provider device from the blockchain when receiving an audit request for the query request, and sending the audit request to the service provider device, so that the service provider device returns the encrypted query result that corresponds to the query request based on the audit request, and uses the encrypted query result as a standard result; and auditing the service provider device based on the result to be audited and the standard result.

A data auditing method includes the following: determining, by a service provider device when receiving a query request sent by a proxy device, an encrypted query result that corresponds to the query request based on the query request, and storing the encrypted query result as a result to be audited in a blockchain; determining the encrypted query result that corresponds to the query request based on an audit request when receiving the audit request sent by the proxy device for the query request, and using the encrypted query result as a standard result; and returning the standard result to the proxy device, so that the proxy device audits the service provider device based on the standard result and the result to be audited that is obtained from the blockchain.

A data auditing device includes the following: an evidence storage module, configured to send a query request to several service provider devices when receiving the query request, so that each service provider device determines an encrypted query result that corresponds to the query request based on the query request, and stores the encrypted query result as a result to be audited in a blockchain; an acquisition module, configured to obtain the result to be audited that is stored by each service provider device from the blockchain when receiving an audit request for the query request, and send the audit request to the service provider device, so that the service provider device returns the encrypted query result that corresponds to the query request based on the audit request, and uses the encrypted query result as a standard result; and an audit module, configured to audit the service provider device based on the result to be audited and the standard result.

A data auditing device includes the following: an evidence storage module, configured to determine, when receiving a query request sent by a proxy device, an encrypted query result that corresponds to the query request based on the query request, and store the encrypted query result as a result to be audited in a blockchain; a response module, configured to determine the encrypted query result that corresponds to the query request based on an audit request when receiving the audit request sent by the proxy device for the query request, and use the encrypted query result as a standard result; and a sending module, configured to return the standard result to the proxy device, so that the proxy device audits the service provider device based on the standard result and the result to be audited that is obtained from the blockchain.

A proxy device includes one or more processors and a memory, where the memory stores a program, and the program is configured to be used by the one or more processors to perform the following steps: sending a query request to several service provider devices when receiving the query request, so that each service provider device determines an encrypted query result that corresponds to the query request based on the query request, and stores the encrypted query result as a result to be audited in a blockchain; obtaining the result to be audited that is stored by each service provider device from the blockchain when receiving an audit request for the query request, and sending the audit request to the service provider device, so that the service provider device returns the encrypted query result that corresponds to the query request based on the audit request, and uses the encrypted query result as a standard result; and auditing the service provider device based on the result to be audited and the standard result.

A service provider device includes one or more processors and a memory, where the memory stores a program, and the program is configured to be used by the one or more processors to perform the following steps: determining, when receiving a query request sent by a proxy device, an encrypted query result that corresponds to the query request based on the query request, and storing the encrypted query result as a result to be audited in a blockchain; determining the encrypted query result that corresponds to the query request based on an audit request when receiving the audit request sent by the proxy device for the query request, and using the encrypted query result as a standard result; and returning the standard result to the proxy device, so that the proxy device audits the service provider device based on the standard result and the result to be audited that is obtained from the blockchain.

The at least one technical solution used in the implementations of the present specification can achieve the following beneficial effects:

According to the method and device provided in the present specification, when receiving the query request, each service provider device can store, in the blockchain, the result to be audited that is obtained after irreversible encryption is performed on the query result. As such, if the audit request for the query request is received subsequently, each service provider device can be audited based on the result to be audited that is stored in the blockchain and the encrypted query result (which is used as the standard result) returned by each service provider device. Because the result to be audited that is used for evidence storage is the encrypted query result, privacy data of each service provider can be prevented from leaking. In addition, the possibility of tempering the result to be audited in the blockchain is eliminated. Therefore, each service provider device can be audited, to provide a better basis for carrying out the service of the multi-provider type, and improve user experience.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute improper limitations on the present application. In the accompanying drawings.

DESCRIPTION OF IMPLEMENTATIONS

To make the objectives, technical solutions, and advantages of the present specification clearer, the following clearly and completely describes the technical solutions of the present application with reference to the specific implementations and the corresponding accompanying drawings of the present specification. Apparently, the described implementations are merely some rather than all of the implementations of the present application. All other implementations obtained by a person of ordinary skill in the art based on the implementations of the present specification without creative efforts shall fall within the protection scope of the present application.

The technical solutions provided in the implementations of the present application are described in detail below with reference to the accompanying drawings.

Figure 1:
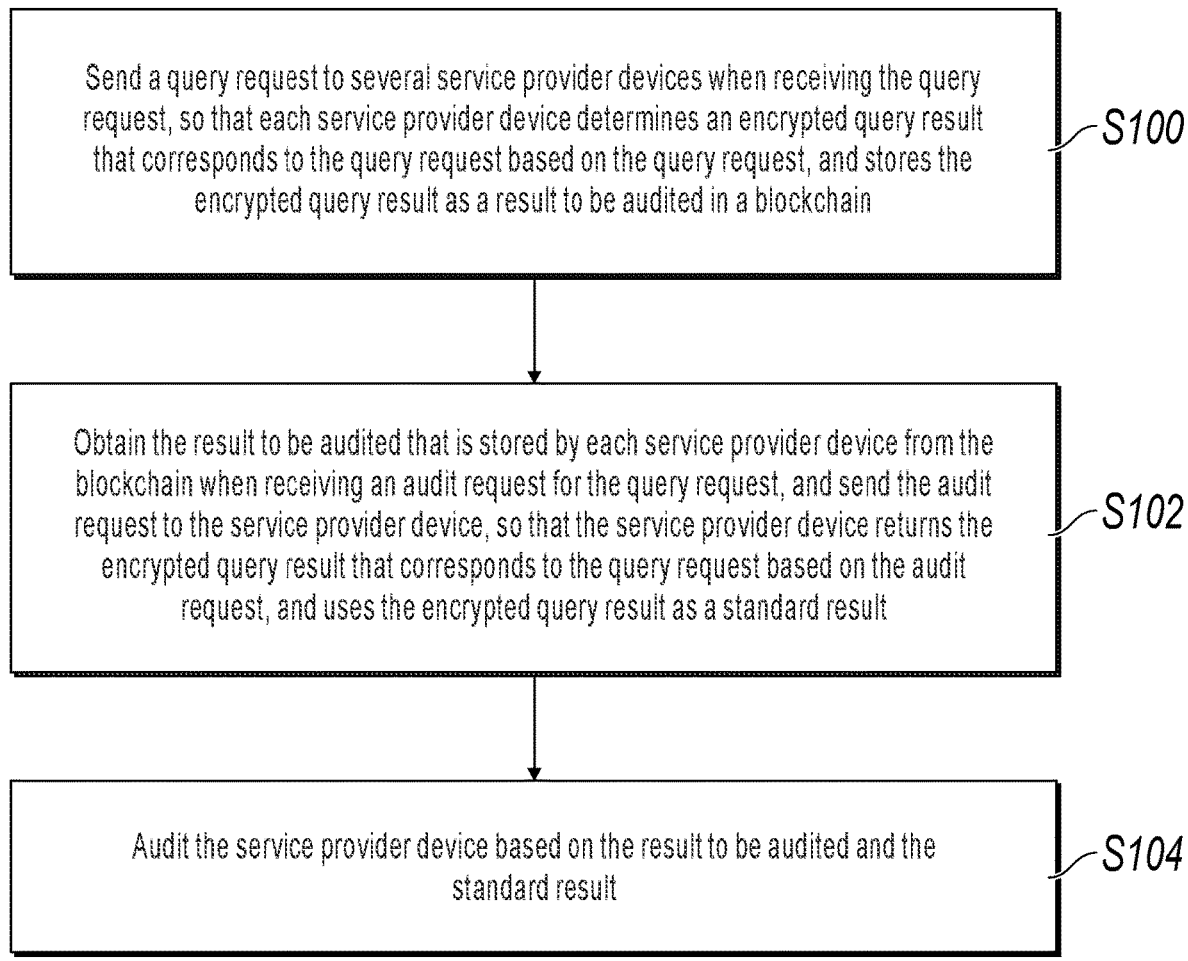
FIG. 1 illustrates a data auditing process, according to an implementation of the present specification.

FIG. 1 illustrates a data auditing process, according to an implementation of the present specification. The process can include the following steps.

S100. Send a query request to several service provider devices when receiving the query request, so that each service provider device determines an encrypted query result that corresponds to the query request based on the query request, and stores the encrypted query result as a result to be audited in a blockchain.

In one or more implementations of the present specification, the data auditing process can be a process of auditing data of a plurality of service providers in a scenario of a service of a multi-provider type. For example, if user a applies to insurance company e for insurance, insurance company e can send an audit request to other insurance companies to determine an asset condition of user a and a total insured amount, to subsequently determine whether to provide an insurance service for user a. The present specification does not limit a specific service of the multi-provider type.

For ease of description, the following provides description by using a multi-lender loan as the service scenario in the data auditing process provided in the present specification. Therefore, the query request can be a loan query request, each service provider can be a lender that provides a loan service, the service provider device can be a lender device, and the auditing process can be a process of auditing data that corresponds to an amount of loans provided by each lender for a user.

In a multi-lender loan scenario, when a user applies to any lender for a multi-lender loan, the user can provide a total amount of loans obtained by the user from other lenders, so that the lender can join a multi-lender loan service and determines a subsequent operation. Therefore, in the present specification, the user can send a loan query request to query the total amount of loans obtained by the user from the lenders. Alternatively, the lender can query the total amount of loans obtained by the user. Therefore, in the present specification, alternatively, the lender can send a loan query request to query the total amount of loans obtained by the user from the lenders. Certainly, alternatively, another person or institution can send a loan query request to query a total amount of loans obtained by a user from the lenders.

Therefore, in the present specification, when receiving the loan query request, a proxy device can send the loan query request to each lender device. The proxy device can be a software server integrated into a third-party device that does not share any mutual interests with the lenders, or can be integrated on a certain lender device. Implementations are not limited in the present specification.

In addition, in the present implementation of the present specification, after receiving the loan query request, the proxy device can establish a service process based on the loan query request, and determine a serial number of the service process, that is, a serial number that corresponds to the loan query request.

Further, in the present specification, after receiving the loan query request, the proxy device can send the loan query request to each lender device, so that each lender device returns an encrypted amount of loans obtained by the user from the lender, and determines a total amount of loans of the user based on each encrypted amount of loans.

First, in the multi-lender loan scenario, the user can obtain a loan from any lender that provides a loan service. Therefore, the proxy device can first determine each lender device that provides a loan service. The lender device in the present specification can be a device such as a server or a terminal of the lender. Certainly, the present specification does not limit a method used by the proxy device to determine each lender device.

Afterwards, the proxy device can further send the loan query request to each lender device, so that each lender device determines a limit of loans obtained by the user from the lender as a query result based on the loan query request. Finally, after the query result is encrypted, the query result is used as a result to be audited for evidence storage and is returned to the proxy device. It is worthwhile to note that, for each lender, the query result is the amount of loans if the lender has provided a loan for the user, or the query result can be zero if the lender has not provided a loan for the user.

To facilitate subsequent verification on the query result, the lender device can store the query result for evidence storage. To prevent the query result from being leaked or tampered with, the lender device can first perform irreversible encryption on the query result to obtain an encrypted result, so that the query result cannot be restored even if another person obtains the encrypted result, to avoid privacy data leakage. Afterwards, the encrypted result is stored as a result to be audited in the blockchain to ensure that the result to be audited cannot be tampered with. After the query result is encrypted, a digest of the query result can be obtained. In other words, the result to be audited can be the digest of the query result.

The lender device can first generate a random number. A value interval of the random number can be set as needed, and is not limited in the present specification. Afterwards, the query result (that is, the amount of loans) and the random number are combined, a result obtained through combination is then encrypted based on a predetermined irreversible encryption algorithm to obtain an encrypted result and use the encrypted result as the result to be audited, and the result to be audited is finally stored in the blockchain. A method for combining the random number and the query result can be set as needed. An algorithm for the irreversible encryption can include at least one of a message digest algorithm 5 (MD5), a hash algorithm, and a secure hash standard (SHS).

For example, if lender device a generates a random number 1325, and the query result is that an amount of loans of user b is 500,000 in RMB, lender device a can insert the random number into a specified location of the query result, and then perform MD5 encryption to obtain an encrypted result. If a plaintext obtained after combination is: The amount of loans of user b is 500,000 in RMB 1325, after MD5 encryption, 96e052089c61792b80faf2dd9901f7b6, that is, the result to be audited, is obtained.

Figure 2A:
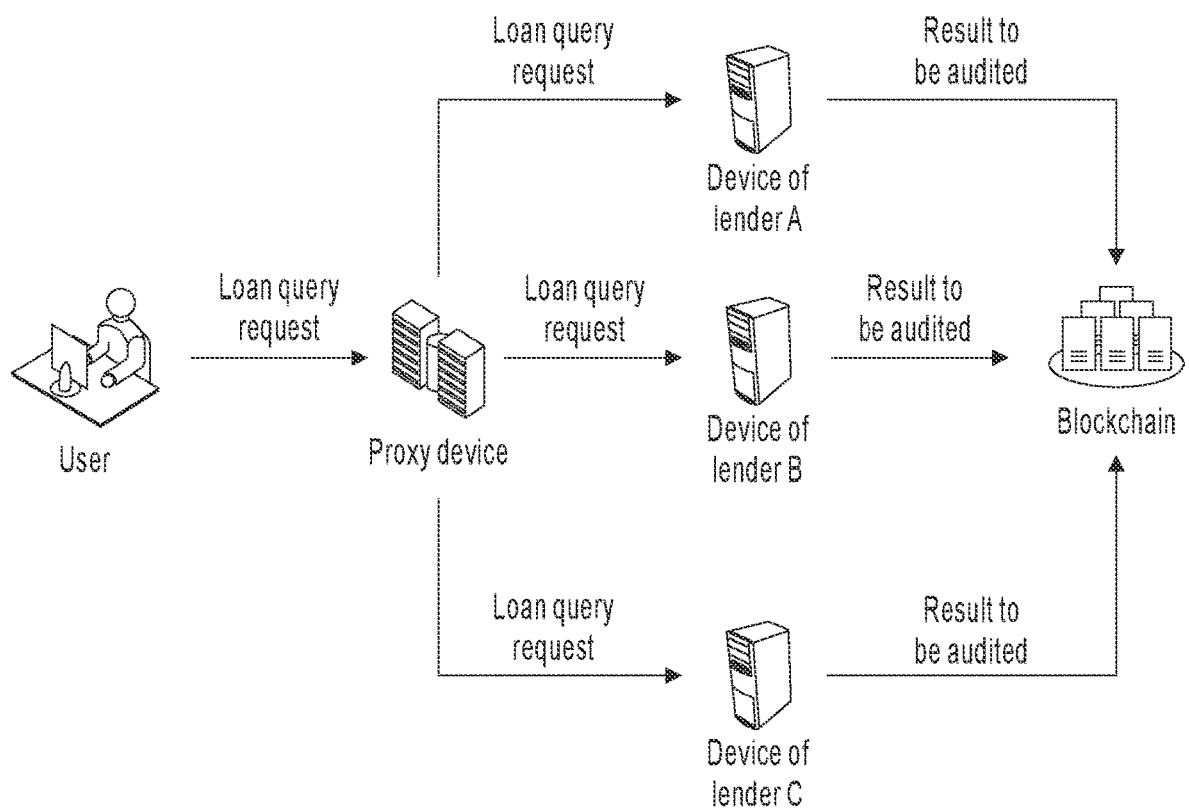
FIG. 2a to FIG. 2c are schematic diagrams illustrating a system that includes all parties in a data auditing process, according to an implementation of the present specification.

For ease of understanding, as shown in FIG. 2a, the present specification correspondingly provides a schematic diagram of a system that includes all parties for the previous process. It can be seen that the user sends the loan query request to the proxy device, the proxy device sends the loan query request to lender devices (for example, a device of lender A to a device of lender C in FIG. 2a), and each lender device stores a determined result to be audited in a blockchain to complete a data evidence storage process. The loan query request is not directly sent to each lender device, but is forwarded by the proxy device as an intermediary to each lender device.

Further, the lender devices in the present specification can return their respective determined query results to the proxy device. For each lender device, to prevent privacy data leakage, the lender device can return the encrypted query result to the proxy device, that is, return the result to be audited to the proxy device. In this case, the proxy server can further receive results to be audited that are respectively returned by the lender devices, and process the results to be audited by using a secret shared (SS) method, to obtain the total amount of loans of the user and provide the total amount of loans for the user. The total amount of loans can further include the serial number that corresponds to the loan query request, so that the user can determine a loan query request that corresponds to the total amount of loans, that is, the query result.

Figure 2B:
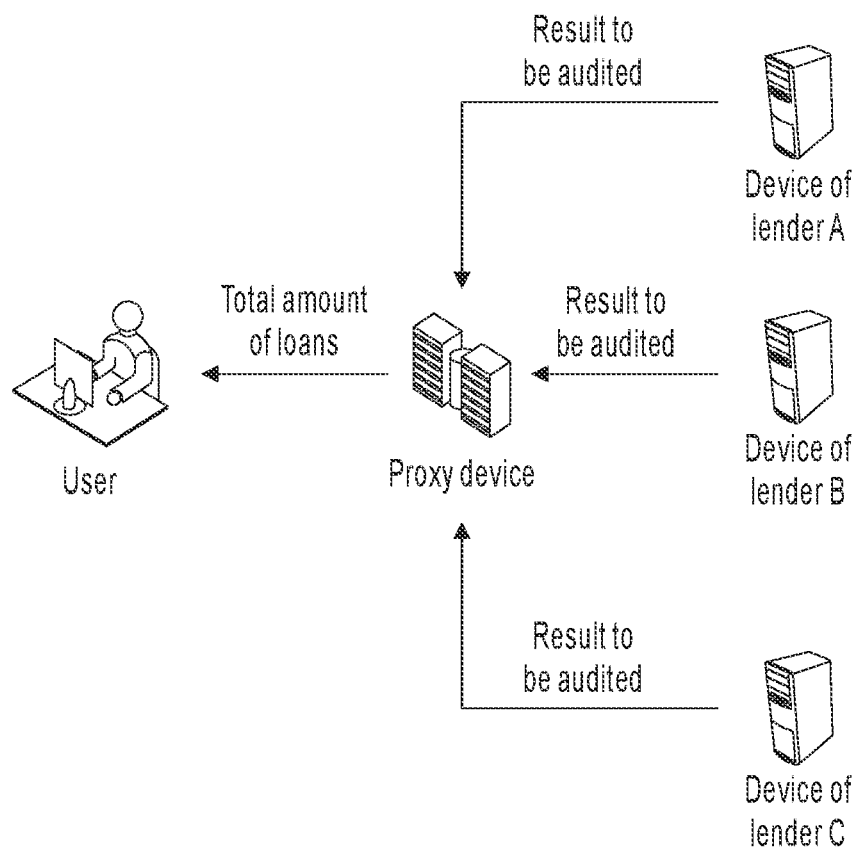

Certainly, based on the schematic diagram of the system shown in FIG. 2a, each lender device can return the obtained result to be audited to the proxy device, and the proxy device determines the total amount of loans of the user, and then returns the total amount of loans to the user, as shown in FIG. 2b.

In addition, for each lender device, a type of blockchain that the lender device stores the result to be audited in is not limited in the present specification.

S102. Obtain the result to be audited that is stored by each service provider device from the blockchain when receiving an audit request for the query request, and send the audit request to the service provider device, so that the service provider device returns the encrypted query result that corresponds to the query request based on the audit request, and uses the encrypted query result as a standard result.

In the present implementation of the present specification, the proxy device is used as the main entity of the data auditing process. Because step S100 can be considered as a data evidence storage process, each lender device can store the result to be audited for evidence storage. In addition, for the loan query request, the proxy device can obtain the total amount of loans of the user and return the total amount of loans to the user based on the result to be audited returned by each lender device. If the user doubts the total amount of loans, it indicates that the result to be audited returned by the lender device is inaccurate. In this case, the user can further initiate an audit request for the loan query request to the proxy device. The proxy device can obtain the result to be audited that is stored by each lender device in the blockchain, obtain the encrypted query result that corresponds to the query request from each lender device again, and use the encrypted query result as a standard result, to help to audit each lender device subsequently.

The audit request can further include the serial number that corresponds to the loan query request.

In addition, the audit request can be directly initiated by the user to the proxy device, or can be initiated by the user by using a certain lender device. In this case, a sender of the audit request can be any lender device. Implementations are not limited in the present specification.

Further, the result to be audited that is stored by each lender device in the blockchain is obtained. The result to be audited is the encrypted query result that corresponds to the query request.

For each lender device, in step S100, the proxy device receives a storage address that corresponds to the loan query request and that is returned by the lender device. Therefore, the proxy device can locally store a mapping relationship between the lender device, the storage address, and the serial number. Therefore, the proxy device can determine the storage address that corresponds to the serial number and that is returned by the lender device based on the serial number included in the audit request, and obtain the result to be audited that corresponds to the loan query request and that is stored by the lender device from the blockchain based on the storage address.

For example, it is assumed that in step S100, the proxy device stores a data mapping relationship shown in Table 1.

TABLE 1

| Total amount of loans | Serial number | Lender identifier | Storage address |
|---|---|---|---|
| 1 million RMB | 0WK00 | Bank a | X1 |
| | | Bank b | X2 |
| | | Bank c | X3 |
| | | Bank d | X4 |
| | | Bank e | X5 |

The proxy device can directly determine the storage address of the result to be audited of each lender device based on the serial number, and obtain each result to be audited from the blockchain.

Further, for sending the audit request to the lender device, the lender device can establish and store a mapping relationship between each serial number, each query result, and each random number in step S100. Therefore, after the proxy device sends the audit request to the lender device, the lender device can determine the corresponding query result and the corresponding random number based on the serial number included in the audit request, use the method in step S100 to combine the query result and the random number, perform irreversible encryption on a result obtained through combination, and return the encrypted result as the standard result to the proxy device.

S104. Audit the service provider device based on the result to be audited and the standard result.

In the present implementation of the present specification, the proxy device can audit the lender device after determining the result to be audited that is used for evidence storage and that is stored by the lender device in the blockchain and obtaining the standard result returned by the lender. For example, it is determined whether the standard result returned by the lender is consistent with the result to be audited that is stored in the blockchain; and if yes, it can be determined that the result to be audited that is stored by the lender device is verified.

Figure 2C:
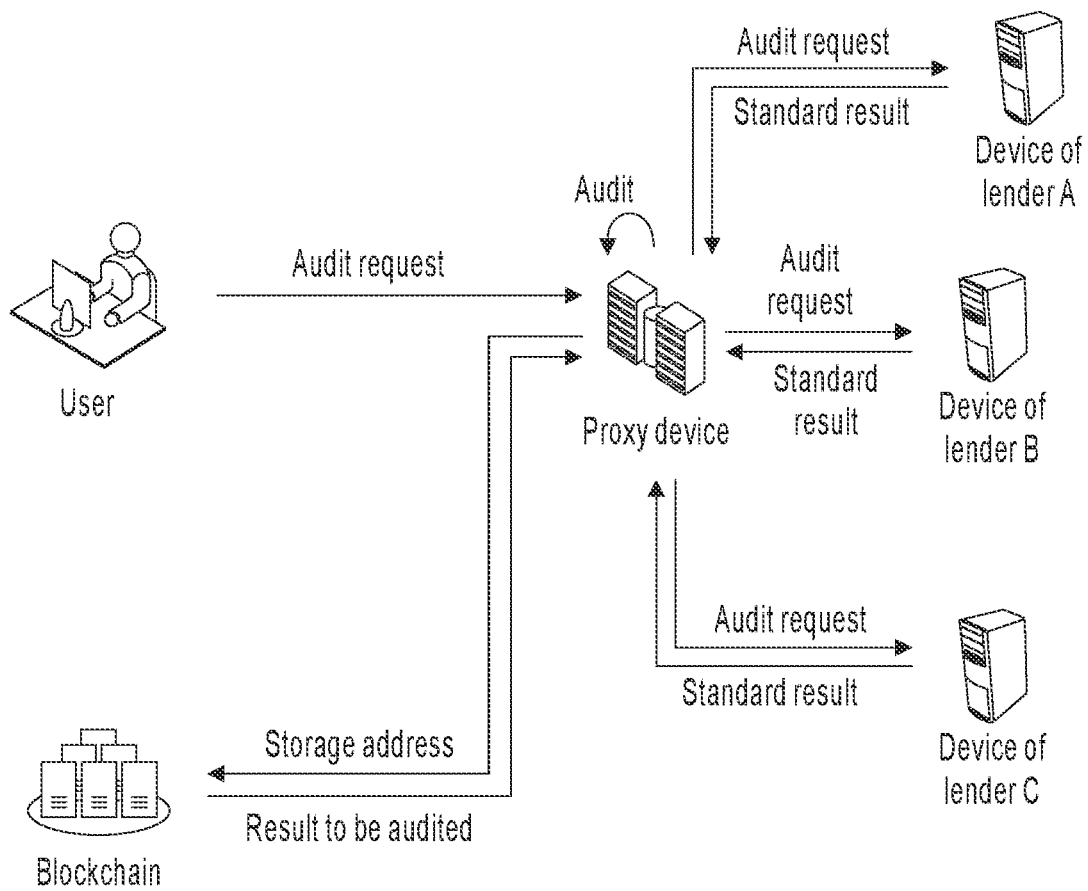

To help understand the present specification, based on the system shown in FIG. 2a and FIG. 2b, the present specification further provides a schematic diagram of a system that corresponds to step S104, as shown in FIG. 2c. It can be seen that in a first step, an audit request is sent to a proxy device. In a second step, the proxy device can send the audit request to each lender device, receive a standard result returned by each lender device, and obtain each result to be audited from a blockchain. Afterwards, in a third step, audit is performed based on each result to be audited that is obtained from the blockchain and the standard result obtained from each lender device. The audit request is forwarded by the proxy device to each lender device, and the proxy device separately audits each result to be audited that is stored by each lender in the blockchain.

It is worthwhile to note that, in the data auditing method provided in the present specification, the result to be audited that is for evidence storage is provided by each lender device and is stored in the blockchain, but the authenticity of the result to be audited is not verified. In addition, the standard result is also provided by each lender device, and the authenticity is not verified either.

For example, bank a determines that a query result is that an amount of loans of a user is 100,000 RMB. However, it is assumed that bank a tampers the query result, changes the query result to an amount of loans of 1 million RMB for the user, and generates a result to be audited. The result to be audited is directly stored by bank a in the blockchain, and there is no supervision or verification of the query result's authenticity in the whole process of generating the result to be audited. Therefore, the authenticity of the result to be audited is not verified. Similarly, the authenticity of the standard result is not verified either.

If the lender device tampers the result to be audited when storing the result to be audited, in the subsequent auditing process, the proxy device can only determine whether the standard result returned by the lender device is consistent with the result to be audited that is obtained from the blockchain, and return the audit result to the user. However, the proxy device cannot determine whether the result to be audited is true, and cannot determine whether the query result (such as the amount of loans) used to generate the result to be audited is true.

Using again the previous example. If bank a still determines, after receiving the audit request, the standard result by using the query result of the amount of loans of RMB 1 million of the user, the proxy device can only verify that the standard result is consistent with the result to be audited that is stored in the blockchain, but cannot verify whether the result to be audited is true.

It can be seen that, even if the lender device makes alteration in the data evidence storage process (that is, in step S100) and makes alteration during data auditing, the user may still doubt the audit result and the total amount of loans. In this case, the user can send an audit request for the loan query request to the proxy device again.

In the present implementation of the present specification, to prevent the lender device from repeatedly tampering the data returned to the proxy device, the proxy device can further send a detail acquisition request to each lender device, so that each lender device determines a query result, and returns the query result to the proxy device. The proxy device then returns the query result returned by each lender device to the user, so that the user can determine a suspicious query result based on each query result, and then manually audit the query result.

Certainly, for information about manually auditing the query result subsequently, a method that is the same as the existing technology can be used. Implementations are not limited in the present specification.

In the present implementation of the present specification, the proxy device can send a detail acquisition request to each lender device if the proxy device receives an audit request for the same loan query request several times. Alternatively, the proxy device sends a detail acquisition request to each lender device when receiving a detail acquisition request sent by the user.

Further, each lender device can provide the query result determined by the lender device based on the detail acquisition request. Therefore, to prevent data leakage to another person, the proxy device can further determine whether the user has permission to view the query result before sending the detail acquisition request to each lender device.

The proxy device can first obtain identity information of the user, to determine whether the user has the permission to view the query result based on the identity information; and if yes, send the detail acquisition request; or if no, not to send the detail acquisition request. Alternatively, the proxy device sends the identity information of the user to each lender device, and each lender device then returns the query result when determining that the user has the permission to view the query result.

For example, the proxy device can determine whether a loan status queried by the user is a loan status of the user; and if yes, determine that the user has the permission to view the query result; or determine whether the lender has a permission from the user when the lender sends the detail acquisition request, etc. Certainly, another method that is the same as the existing technology can also be used, and the present specification does not limit how to determine whether the user has the permission to view the query result.

It is worthwhile to note that the steps in the method provided in the present implementation of the present specification can be performed by one device, or the method can be performed by different devices. For example, step S100 and step S102 can be performed by a device 1, and step S102 can be performed by a device 2. Alternatively, step S100 can be performed by a device 1, and step S102 and step S104 can be performed by a device 2, etc. Specified implementations of the present specification are described above. Other implementations fall within the scope of the appended claims. In some cases, the actions or steps described in the claims can be performed in an order different from the order in the implementations, and desired results can still be achieved. In addition, the process depicted in the accompanying drawings does not necessarily require a particular execution order to achieve the desired results. In some implementations, multitasking and parallel processing can be performed or can be advantageous.

In addition, in the present implementation of the present specification, the proxy device can receive a storage address that is of the result to be audited in the blockchain and that is returned by each lender device. If the audit request for the loan query request is subsequently received, the proxy device can determine the result to be audited that is stored by the lender device based on the storage address, to perform subsequent steps. Therefore, the proxy device can further establish and store a mapping relationship between the proxy device, the storage address, and the loan query request. For each lender device, when receiving the storage address that is of the result to be audited in the blockchain and that is returned by the lender device, the proxy device can establish a mapping relationship between a device identifier of the proxy device, a serial number of the loan query request, and the storage address. The serial number can be a serial number that corresponds to the loan query request determined by the proxy device in step S100, or a serial number that corresponds to the loan query request and that is provided by the lender device. Implementations are not limited in the present specification.

Further, in the previous implementation of the present specification, description is provided by using an example in which the auditing method is applied to the multi-lender loan scenario. Certainly, the auditing method can also be applied to different service scenarios.

For example, when a user's insurance status is audited, the query request can be an insurance query request, and each service provider can be an insurance service provider. When a user's asset status is audited, the query request can be an asset query request, and each service provider can be an institution or enterprise such as a bank, an insurance company, or a real estate transaction center. The present specification does not limit an application scenario that the auditing method is applied to.

Figure 3:
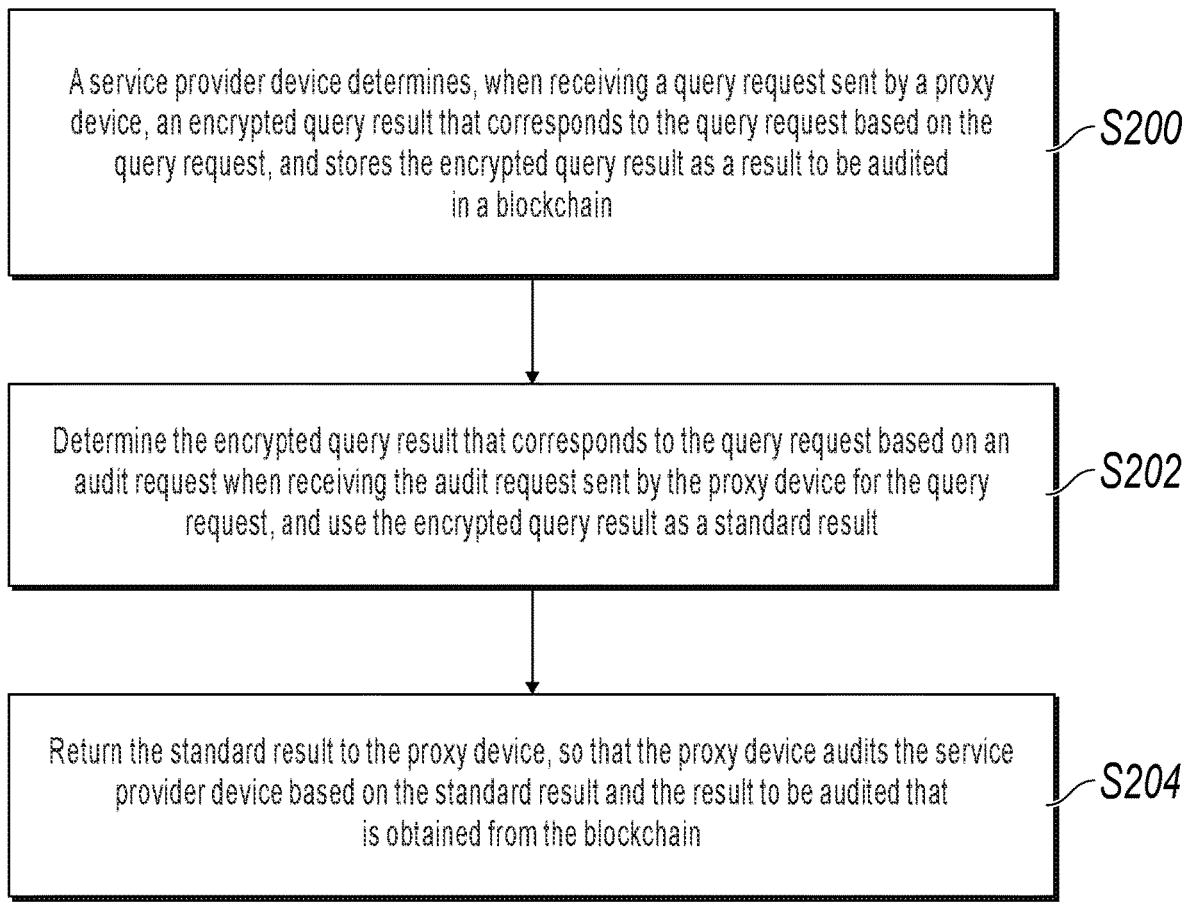
FIG. 3 illustrates another data auditing process, according to an implementation of the present specification.

Based on the data auditing method shown in FIG. 1, an implementation of the present specification further correspondingly provides a data auditing method performed by a service provider device, as shown in FIG. 3.

FIG. 3 is a schematic diagram illustrating a data auditing process according to an implementation of the present specification. The process can include the following steps.

S200. A service provider device determines, when receiving a query request sent by a proxy device, an encrypted query result that corresponds to the query request based on the query request, and stores the encrypted query result as a result to be audited in a blockchain.

In the present implementation of the present specification, description is provided still by using an example in which a query request is used as a loan query request, and an auditing process is a multi-lender loan scenario. Therefore, the service provider device can be a lender device in the loan scenario, and the lender device can receive a loan query request sent by the proxy device. The loan query request can include a user identifier (for example, an identifier such as an account identifier or an identity number that can uniquely determine a user identity).

Afterwards, the lender device can establish a corresponding service process based on the loan query request, and execute the service process to determine an amount of loans that corresponds to the user identifier as a query result.

In addition, in the present implementation of the present specification, the lender can be a financial institution providing a loan service, etc. The lender device can be a device such as a terminal or a server. Implementations are not limited in the present specification.

In the present implementation of the present specification, after the lender device determines the query result, to prevent the query result (that is, privacy data) from being leaked, the lender device can further perform irreversible encryption on the query result, and use the encrypted query result as the result to be audited. To subsequently audit the query result, the lender device can further store the result to be audited in the blockchain. In addition, the lender device can return the obtained result to be audited to the proxy device, so that the proxy device determines a total amount of loans of the user.

For a process that the lender device obtains the result to be audited, reference can be made to the description in step S102. To be specific, the random number is generated, the query result and the random number are combined, irreversible encryption is then performed on a result obtained through combination, and an obtained encrypted result is used as the result to be audited. Details are omitted in the present specification. In addition, a type of blockchain that the lender device stores the obtained result to be audited in is not limited in the present specification.

In addition, the lender device can determine a serial number that corresponds to the loan query request, and establish and store a mapping relationship between the query result, the random number, and the serial number. As such, when the result to be audited that is returned to the proxy device needs to be audited subsequently, the query result and the random number can be determined based on the serial number, to obtain the standard result and return the result to the proxy device for audit. The serial number can be included in the loan query request, or can be determined by the lender device based on the loan query request. Implementations are not limited in the present specification.

Certainly, to help the proxy device determine that loan query request that corresponds to the result to be audited, that is, the encrypted result, each lender device can return the serial number to the proxy device together with the result to be audited.

S202. Determine the encrypted query result that corresponds to the query request based on an audit request when receiving the audit request sent by the proxy device for the query request, and use the encrypted query result as a standard result.

S204. Return the standard result to the proxy device, so that the proxy device audits the service provider device based on the standard result and the result to be audited that is obtained from the blockchain.

If the audit request received by the lender device can include the serial number that corresponds to the loan query request, the lender device can determine the random number and the query result that correspond to the serial number from a locally stored mapping relationship between each query result, each random number, and each serial number based on the serial number, and use the same method in step S102 to determine the encrypted query result as the standard result and return the standard result to the proxy device, to enable the proxy device to perform step S104. Specific implementations and processes are described in the corresponding steps in the present specification, and are not repeated in the present specification again.

In addition, in another implementation provided in the present specification, in step S200, the lender device can establish and store a mapping relationship between the serial number that corresponds to the loan query request, service data that corresponds to the loan query request, and the random number. Further, in step S202, the serial number of the loan query request for the audit request can be first determined when the audit request for the loan query request is received. The service data that corresponds to the loan query request is then determined based on the serial number, and the query result is determined based on the service data (to be specific, the process of determining the query result based on the loan query request in step S200 is repeated). Finally, the query result and the random number are combined, an encrypted result obtained by performing irreversible encryption on a result obtained through combination is then used as a standard result, and the standard result is returned to the proxy device.

In step S200, the lender device may not store the query result, but store the service data that corresponds to the query request, so that the process of determining the query result in step S200 based on the service data can be repeated subsequently. For example, the service data can include an account identifier, query content, a query time period, etc. The risk of the leakage of the query result caused by storing the query result by the lender device is avoided. Certainly, a type of data included in the service data is not limited in the present specification.

Figure 4:
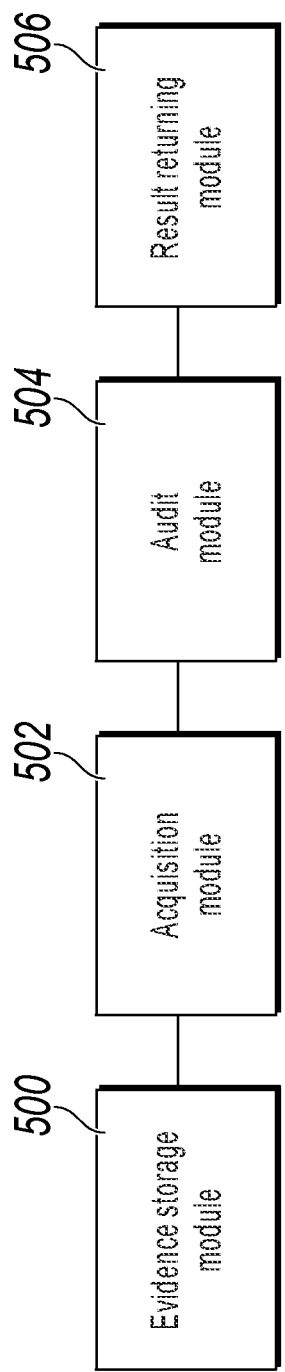
FIG. 4 is a schematic structural diagram illustrating a data auditing device, according to an implementation of the present specification.

Based on the data auditing method shown in FIG. 1, as shown in FIG. 4, an implementation of the present specification further provides a data auditing device.

FIG. 4 is a schematic structural diagram illustrating a data auditing device, according to an implementation of the present specification. The data auditing device includes the following: an evidence storage module 500, configured to send a query request to several service provider devices when receiving the query request, so that each service provider device determines an encrypted query result that corresponds to the query request based on the query request, and stores the encrypted query result as a result to be audited in a blockchain; an acquisition module 502, configured to obtain the result to be audited that is stored by each service provider device from the blockchain when receiving an audit request for the query request, and send the audit request to the service provider device, so that the service provider device returns the encrypted query result that corresponds to the query request based on the audit request, and uses the encrypted query result as a standard result; and an audit module 504, configured to audit the service provider device based on the result to be audited and the standard result.

After receiving the query request, the evidence storage module 500 determines a serial number that corresponds to the query request, and sends the serial number to each service provider device, so that each service provider device establishes and stores a mapping relationship between the serial number and the query result determined by the service provider device.

The device further includes the following:

The evidence storage module 500, which is configured to receive a storage address that is of the result to be audited in the blockchain and that is returned by each service provider device, and establishes and stores a mapping relationship between the service provider device, the storage address, and the serial number.

The audit request includes the serial number that corresponds to the query request. The acquisition module 502 obtains the result to be audited that corresponds to the serial number and that is stored by the service provider device in the blockchain based on a locally stored mapping relationship between each service provider device, each serial number, and each storage address.

The query request is a loan query request, and the device further includes the following: a result returning module 506, configured to receive the result to be audited that is returned by each service provider device; and process each result to be audited to obtain and return a total amount of loans.

Figure 5:
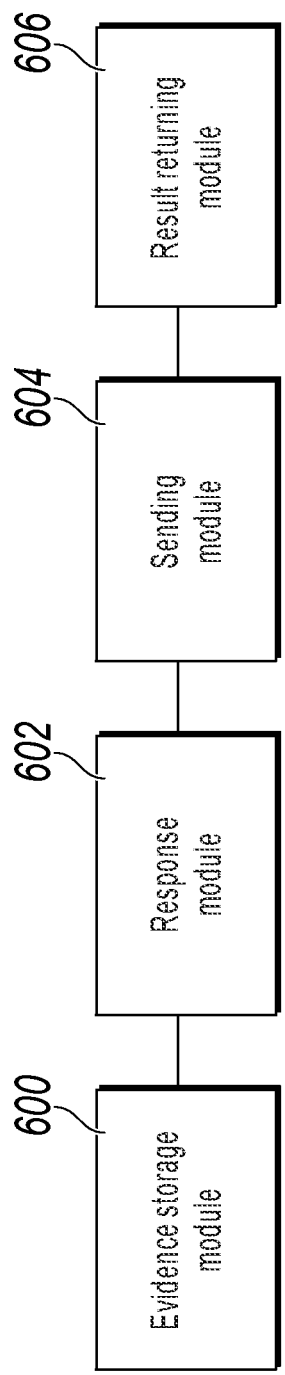
FIG. 5 is a schematic structural diagram illustrating another data auditing device, according to an implementation of the present specification.

Based on the data auditing method shown in FIG. 3, as shown in FIG. 5, an implementation of the present specification further provides another data auditing device.

FIG. 5 is a schematic structural diagram illustrating a data auditing device, according to an implementation of the present specification. The data auditing device includes the following: an evidence storage module 600, configured to determine, when receiving a query request sent by a proxy device, an encrypted query result that corresponds to the query request based on the query request, and store the encrypted query result as a result to be audited in a blockchain; a response module 602, configured to determine the encrypted query result that corresponds to the query request based on an audit request when receiving the audit request sent by the proxy device for the query request, and use the encrypted query result as a standard result; and a sending module 604, configured to return the standard result to the proxy device, so that the proxy device audits the service provider device based on the standard result and the result to be audited that is obtained from the blockchain.

The evidence storage module 600 generates a random number, combines the random number and the query result, performs irreversible encryption on a result obtained through combination, and stores an obtained encrypted result as the result to be audited in the blockchain.

The evidence storage module 600 determines a serial number that corresponds to the query request, and establishes and stores a mapping relationship between the query result, the random number, and the serial number.

The device further includes the following: a result returning module 606, configured to return a storage address of the result to be audited and the serial number to the proxy device, so that the proxy device establishes and stores a mapping relationship between the storage address and the serial number.

An algorithm for irreversible encryption includes at least one of the following: a message digest algorithm 5 (MD5), a hash algorithm, and a secure hash standard (SHS).

The audit request includes the serial number that corresponds to the query request. The sending module 604 determines a random number and a query result that correspond to the serial number included in the audit request based on a locally stored mapping relationship between each query result, each random number, and each serial number, combines the determined random number and the query result, performs irreversible encryption on a result obtained through combination, and uses an obtained encrypted result as the standard result.

The query request is a loan query request. The evidence storage module 600 generates a random number, determines an amount of loans based on the query request, combines the random number and the amount of loans, performs irreversible encryption on a result obtained through combination, and stores an obtained encrypted result as the result to be audited in the blockchain.

Figure 6:
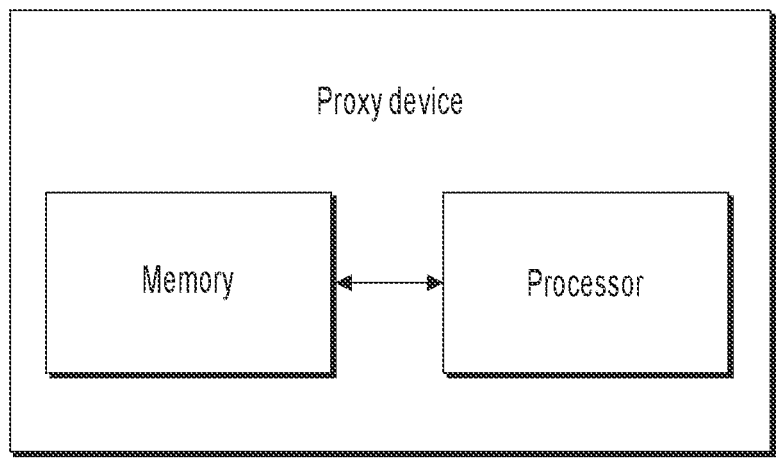
FIG. 6 is a schematic structural diagram illustrating another proxy device, according to an implementation of the present specification.

Based on the data auditing method shown in FIG. 1, the present specification correspondingly provides a proxy device. As shown in FIG. 6, the device includes one or more processors and a memory, the memory stores a program, and the program is configured to be used by the one or more processors to perform the following steps: sending a query request to several service provider devices when receiving the query request, so that each service provider device determines an encrypted query result that corresponds to the query request based on the query request, and stores the encrypted query result as a result to be audited in a blockchain; obtaining the result to be audited that is stored by each service provider device from the blockchain when receiving an audit request for the query request, and sending the audit request to the service provider device, so that the service provider device returns the encrypted query result that corresponds to the query request based on the audit request, and uses the encrypted query result as a standard result; and auditing the service provider device based on the result to be audited and the standard result.

Figure 7:
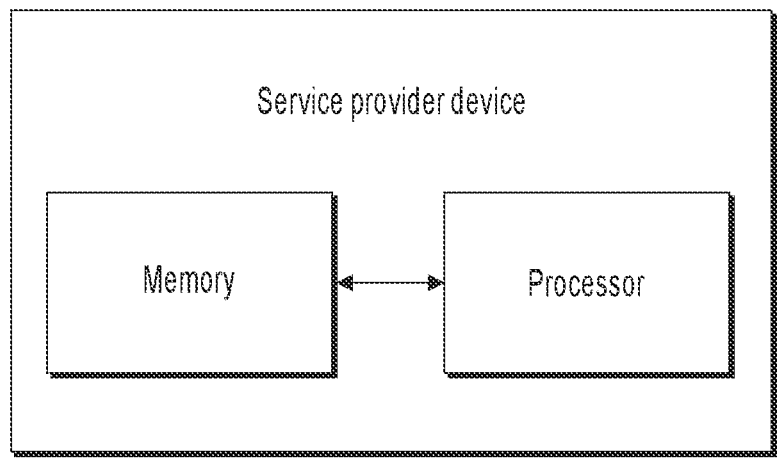
FIG. 7 is a schematic structural diagram illustrating another service provider device, according to an implementation of the present specification.

Based on the data auditing method shown in FIG. 3, the present specification correspondingly provides a service provider device. As shown in FIG. 7, the device includes one or more processors and a memory, the memory stores a program, and the program is configured to be used by the one or more processors to perform the following steps: determining, when receiving a query request sent by a proxy device, an encrypted query result that corresponds to the query request based on the query request, and storing the encrypted query result as a result to be audited in a blockchain; determining the encrypted query result that corresponds to the query request based on an audit request when receiving the audit request sent by the proxy device for the query request, and using the encrypted query result as a standard result; and returning the standard result to the proxy device, so that the proxy device audits the service provider device based on the standard result and the result to be audited that is obtained from the blockchain.

It is worthwhile to note that the implementations in the present specification are described in a progressive way. For the same or similar parts in the implementations, reference can be made to each other. Each implementation focuses on a difference from other implementations. Particularly, the mobile terminal and the server provided in the present implementation of the present application are similar to a method implementation, and therefore, are described briefly. For related parts, reference can be made to partial descriptions in the method implementation.

In the 1990s, whether technology improvement is hardware improvement (for example, improvement of a circuit structure such as a diode, a transistor, or a switch) or software improvement (improvement of a method process) can be obviously distinguished. However, as technologies develop, improvements in many current method processes can be considered as a direct improvement in a hardware circuit structure. Almost all designers obtain corresponding hardware circuit structures by programming improved method processes to hardware circuits. Therefore, a method process can be improved by using a hardware entity module. For example, a programmable logic device (PLD) (such as a field programmable gate array (FPGA)) is such an integrated circuit. A logic function is determined by programming a device by a user. The designer performs programming to "integrate" a digital system to a PLD without requesting a chip manufacturer to design and produce an application-specific integrated circuit chip. In addition, currently, instead of manually producing integrated circuit chips, the programming is mostly implemented by "logic compiler" software, which is similar to a software compiler used for program development and writing. Original code is also written by using a specific programming language, which is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used currently. A person skilled in the art should also understand that a hardware circuit that implements a logical method procedure can be easily obtained once the method procedure is logically programmed by using the several described hardware description languages and is programmed into an integrated circuit.

A controller can be implemented in any appropriate way. For example, the controller can take the form of, for example, a microprocessor or a processor and a computer readable medium storing computer readable program code (such as software or firmware) that can be executed by the microprocessor or the processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller can also be implemented as a part of control logic of a memory. A person skilled in the art also know that, in addition to implementing the controller by using the computer readable program code, logic programming can be performed through method steps to allow the controller to implement the same function in forms of the logic gate, the switch, the programmable logic controller, the programmable logic controller, and the embedded microcontroller. Therefore, such a controller can be considered as a hardware component, and an apparatus configured to implement various functions in the controller can also be considered as a structure in a hardware component. Or, the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the described apparatus is described by dividing functions into various units. Certainly, when the present application is implemented, the functions of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or the other programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

In typical configuration, a computing device includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory. The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that can be accessed by the computing device. Based on the definition in the present specification, the computer readable medium does not include a transitory computer-readable media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, an optical memory, etc.) that include computer-usable program code.

The present application can be described in the general context of an executable computer instruction executed by a computer, for example, a program module. Generally, the program module includes a routine, a program, an object, a component, a data structure, etc. for executing a particular task or implementing a particular abstract data type. The present application can also be practiced in distributed computing environments. In the distributed computing environments, tasks are performed by remote processing devices that are connected through a communications network. In a distributed computing environment, the program module can be located in both local and remote computer storage media including storage devices.

The implementations in the present specification are described in a progressive way. For same or similar parts in the implementations, reference can be made to the implementations. Each implementation focuses on a difference from other implementations. Particularly, a system implementation is similar to a method implementation, and therefore, is described briefly. For related parts, reference can be made to partial descriptions in the method implementation.

The previous descriptions are merely implementations of the present application, and are not intended to limit the present application. For a person skilled in the art, the present application can have various modifications and changes. Any modifications, equivalent substitutions, improvements, etc. made in the spirit and principle of the present specification shall fall in the scope of the claims in the present specification.

Figure 8:
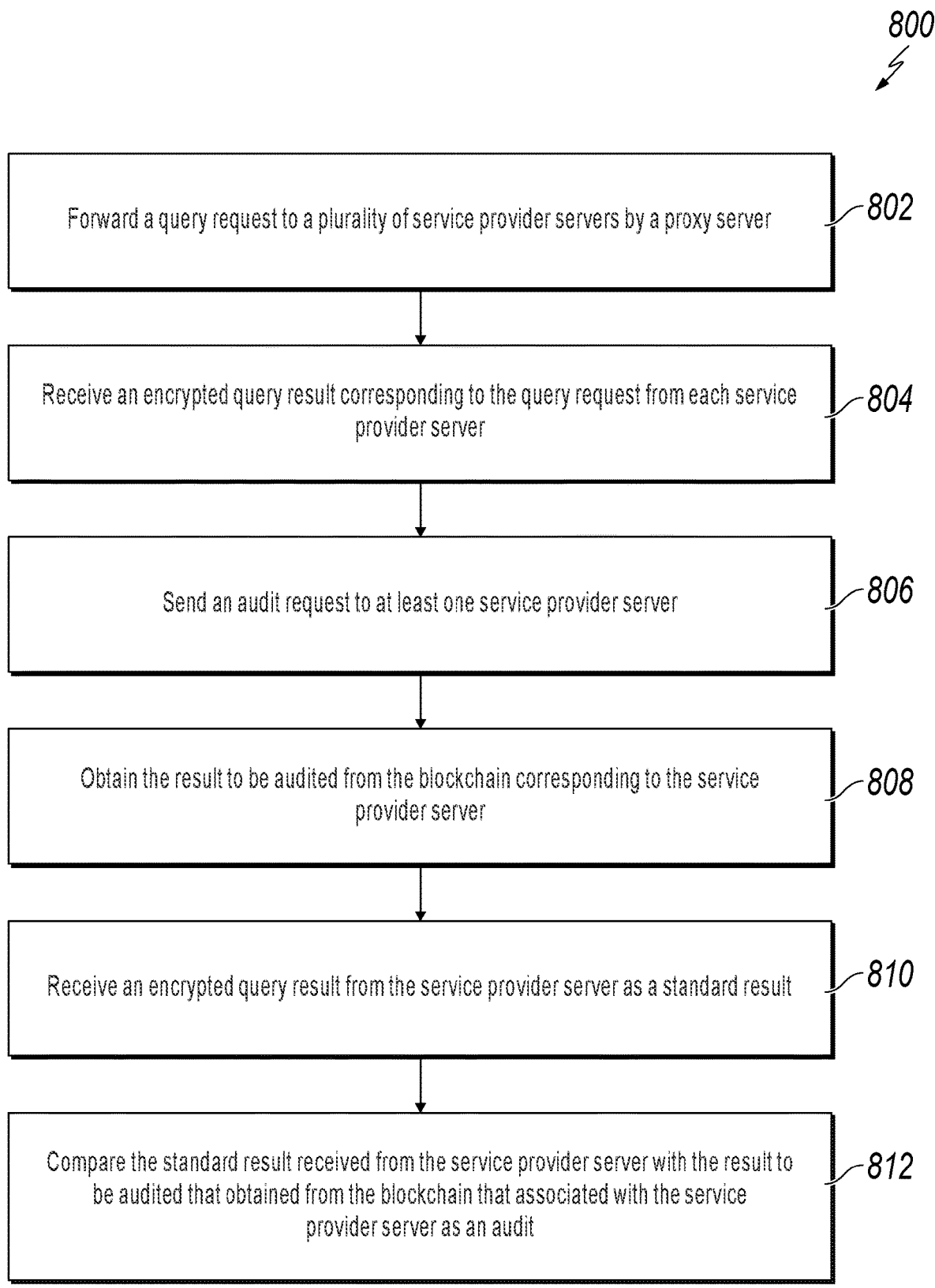
FIG. 8 is a flowchart illustrating an example of a computer-implemented method for auditing data, according to an implementation of the present disclosure.

FIG. 8 is a flowchart illustrating an example of a computer-implemented method 800 for auditing data, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a query request is forwarded to a number of service provider servers by a proxy server. In some implementations, the proxy server determines a serial number based on the query request. After 802, method 800 proceeds to 804.

At 804, an encrypted query result corresponding to the query request is received from each service provider server. In some implementations, a copy of the encrypted query result is stored as a result to be audited in a blockchain that associated with each service provider server.

In some implementations, the encrypting query result that corresponds to the query request is generated by determining, by the service provider server, a query result based on the query request; generating a random number; combining the random number and the query result to render a combined result; and encrypting the combined result based on a predetermined irreversible encryption algorithm to generate the encrypted query result.

In some implementations, the service provider server establishes and stores a mapping relationship using the serial number, the random number and the query result, and the serial number is received at the service provider server from the proxy server.

In some implementations, if the query request is a loan query request, after sending a query request to the one or more service provider servers, the proxy server receives a query result corresponding to the query request from each service provider server, and processes each query result to obtain a total amount of loans. After 804, method 800 proceeds to 806.

At 806, an audit request is sent to at least one service provider server. In some implementations, the audit request comprises the serial number that corresponds to the query request. After 806, method 800 proceeds to 808.

At 808, the result to be audited is obtained from the blockchain corresponding to the service provider server. In some implementations, obtaining a result to be audited from a blockchain is performed by steps include receiving a storage address that is of the result to be audited in the blockchain and that is returned by the service provider device; locally storing, at the proxy server, a mapping relationship between each service provider device, the storage address, and the serial number; upon receiving the audit request, determining, based on the mapping relationship, the storage address that corresponds to the serial number associated with the audit request; and obtaining the result to be audited from the blockchain based on the storage address. After 808, method 800 proceeds to 810.

At 810, as a standard result, an encrypted query result is received from the service provider server. In some implementations, the encrypted query result is generated by encrypting a query result that is determined based on the audit request.

In such implementations, generating the encrypted query result based on the audit request is performed by steps include receiving, the audit request that comprises a serial number corresponding to the query request; determining, a random number and a query result corresponding to the serial number based on the locally stored mapping relationship; combining, the random number and the query result to generate a combined result, and encrypting the combined result based on a predetermined irreversible encryption algorithm to obtain the encrypted query result. After 810, method 800 proceeds to 812.

At 812, as an audit, the standard result received from the service provider server is compared with the result to be audited that obtained from the blockchain that associated with the service provider server. In some implementations, an audit result corresponding to a particular service provider server is considered verified if the standard result corresponding to the particular service provider server is the same as the result to be audited obtained from the blockchain associated with the particular service provider server. After 812, method 800 can stop.

Implementations of the present application can solve technical problems in data auditing. Traditionally, when a service provider server cannot satisfy a user's needs, the user can further make a request to many other service provider serves to obtain data. As such, any service provider provides data to the user needs to audit the user for authentication and risk evaluation before providing the data, and determining the amount of data that can be provided for the user based on the amount of data obtained by the user from other service provider servers (that is, an obtained audit result). However, because the amount of data obtained by a user from a service provider server is privacy data of the service provider server, that service provider server usually is not willing to provide the information to a third party (such as another user or another service provider). In addition, to ensure security of the privacy data, the privacy data is usually stored only at the service provider side. As such, it is difficulty for a service provider server to obtain the privacy data of another service provider server. In addition, even if another service provider server provides the privacy data, the authenticity of the privacy data is difficult to verify. What is needed is a technique to bypass these problems in the conventional methods, and providing a more secured and unified solution.

Implementation of the present application provide method and apparatuses for improving data acquisition efficiency and security. According to these implementations, when receiving a data query request, a proxy server can send the query request to each service provider server. So that each service provider server returns an encrypted data query result obtained by the user from the service provider. The proxy device can obtain the result to be audited that is stored by each lender device in the blockchain, obtain the encrypted query result that corresponds to the query request from each lender device again, and use the encrypted query result as a standard result, to help to audit each lender device subsequently. To facilitate subsequent verification on the query result, the service provider server can store the query result for evidence storage. To prevent the query result from being leaked or tampered with, the service provider server can first perform irreversible encryption on the query result to obtain an encrypted result, so that the query result cannot be restored even if another person obtains the encrypted result, to avoid privacy data leakage. Afterwards, the encrypted result is stored as a result to be audited in the blockchain to ensure that the result to be audited cannot be tampered with. After the query result is encrypted, a digest of the query result can be obtained. In other words, the result to be audited can be the digest of the query result. The proxy server can obtain the result to be audited that is stored by each service provider server in the blockchain, obtain the encrypted query result that corresponds to the query request from each service provider server again, and use the encrypted query result as a standard result, to help to audit each service provider server subsequently.

In some implementations, the described methods and apparatus can reduce data processing for service provider by mitigating a substantive amount of processing to a centralized proxy server. The centralized proxy server can be configured, for example, to save computer processing circles, computer memory usage, and network bandwidth when comparing to processing the described data in multiple different locations (that is, at separate service provider servers) and transmitting result data across a network(s) for subsequent processing to the centralized proxy server.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a service provider device of a plurality of service provider devices and from a proxy device, a query request initiated by a user;
   determining, by the service provider device, a first encrypted query result based on the query request, wherein the first encrypted query result is an encrypted amount of a value previously offered to the user by the service provider device;
   storing, by the service provider device, the first encrypted query result on a blockchain;
   sending, by the service provider device to the proxy device, the first encrypted query result, wherein the proxy device obtains a total amount of values offered to the user by the plurality of service provider devices based on processing first encrypted query results corresponding to the plurality of service provider devices based on a secret sharing (SS) method;
   transmitting, to the user, a response to the query request indicating the total amount of values;
   receiving, by the service provider device and from the proxy device, an audit request initiated by the user;
   determining, by the service provider device and based on the audit request, a second encrypted query result corresponding to the query request; and
   transmitting, from the service provider device, the second encrypted query result to the proxy device, for the proxy device to generate a response to the audit request based on comparing the second encrypted query result and the first encrypted query result stored on the blockchain.

2. The method of claim 1, wherein determining the first encrypted query result based on the query request comprises:
   generating, by the service provider device, a random number;
   determining a first query result based on the query request;
   combining the random number and the first query result to render a combined result; and
   performing an irreversible encryption on the combined result to generate the first encryption query result.

3. The method of claim 2, wherein, after storing the first encrypted query result on the blockchain, the method comprises:
   determining, by the service provider device, a serial number that corresponds to the query request; and
   establishing and storing a mapping relationship between the first encrypted query result, the random number, and the serial number.

4. The method of claim 3, wherein, after storing the first encrypted query result on the blockchain, the method comprises:
sending a storage address of the first encrypted query result and the serial number to the proxy device, wherein the proxy device establishes and stores a mapping relationship between the storage address and the serial number.

5. The method of claim 3, wherein the audit request comprises the serial number that corresponds to the query request; and
determining the second encrypted query result corresponding to the query request comprises:
determining a corresponding random number and a corresponding query result that correspond to the serial number comprised in the audit request based on a locally stored mapping relationship between each query result, each random number, and each serial number; and
combining the corresponding random number and the corresponding query result to render a second combined result; and
performing the irreversible encryption on the second combined result to generate the second encrypted query result.

6. The method according to claim 2, wherein performing the irreversible encryption on the combined result comprises performing at least one of a message digest algorithm 5 (MD5), a hash algorithm, and a secure hash standard (SHS).

7. The method of claim 1, wherein the query request is a loan query request; and
determining the first encrypted query result based on the query request comprises:
generating, by the service provider device, a random number;
determining an amount of loans based on the query request;
combining the random number and the amount of loans to render a combined result; and
performing an irreversible encryption on the combined result to generate the first encrypted query result.

8. The method of claim 1, wherein the query request specifies a service to collectively be performed by the plurality of service provider devices.

9. A non-transitory, computer-readable medium storing one or more instructions executable by a computer system to perform operations comprising:
receiving, by a service provider device of a plurality of service provider devices and from a proxy device, a query request initiated by a user;
determining, by the service provider device, a first encrypted query result based on the query request, wherein the first encrypted query result is an encrypted amount of a value previously offered to the user by the service provider device;
storing, by the service provider device, the first encrypted query result on a blockchain;
sending, by the service provider device to the proxy device, the first encrypted query result, wherein the proxy device obtains a total amount of values offered to the user by the plurality of service provider devices based on processing first encrypted query results corresponding to the plurality of service provider devices based on a secret sharing (SS) method;
transmitting, to the user, a response to the query request indicating the total amount of values;
receiving, by the service provider device and from the proxy device, an audit request initiated by the user;
determining, by the service provider device and based on the audit request, a second encrypted query result corresponding to the query request; and
transmitting, from the service provider device, the second encrypted query result to the proxy device, for the proxy device to generate a response to the audit request based on comparing the second encrypted query result and the first encrypted query result stored on the blockchain.

10. The non-transitory, computer-readable medium of claim 9, wherein determining the first encrypted query result based on the query request comprises:
generating, by the service provider device, a random number;
determining a first query result based on the query request;
combining the random number and the first query result to render a combined result; and
performing an irreversible encryption on the combined result to generate the first encryption query result.

11. The non-transitory, computer-readable medium of claim 10, wherein after storing the first encrypted query result on the blockchain, the operations further comprise:
determining, by the service provider device, a serial number that corresponds to the query request; and
establishing and storing a mapping relationship between the first encrypted query result, the random number, and the serial number.

12. The non-transitory, computer-readable medium of claim 11, wherein after storing the first encrypted query result on the blockchain, the operations further comprise:
sending a storage address of the first encrypted query result and the serial number to the proxy device, wherein the proxy device establishes and stores a mapping relationship between the storage address and the serial number.

13. The non-transitory, computer-readable medium according to claim 10, wherein performing the irreversible encryption on the combined result comprises performing at least one of a message digest algorithm 5 (MD5), a hash algorithm, and a secure hash standard (SHS).

14. The non-transitory, computer-readable medium of claim 11, wherein the audit request comprises the serial number that corresponds to the query request; and
determining the second encrypted query result corresponding to the query request comprises:
determining a corresponding random number and a corresponding query result that correspond to the serial number comprised in the audit request based on a locally stored mapping relationship between each query result, each random number, and each serial number; and
combining the corresponding random number and the corresponding query result to render a second combined result; and
performing the irreversible encryption on the second combined result to generate the second encrypted query result.

15. The non-transitory, computer-readable medium of claim 9, wherein the query request is a loan query request; and
determining the first encrypted query result based on the query request comprises:
generating, by the service provider device, a random number;

determining an amount of loans based on the query request;

combining the random number and the amount of loans to render a combined result; and performing an irreversible encryption on the combined result to generate the first encrypted query result.

16. The non-transitory, computer-readable medium of claim 9, wherein the query request specifies a service to collectively be performed by the plurality of service provider devices.

17. A system comprising:

one or more computers; and one or more computer memory devices interoperably coupled with the one or more computers and having tangible, non-transitory, machine-readable media storing one or more instructions that, when executed by the one or more computers, perform operations comprising:

receiving, by a service provider device of a plurality of service provider devices and from a proxy device, a query request initiated by a user;

determining, by the service provider device, a first encrypted query result based on the query request, wherein the first encrypted query result is an encrypted amount of a value previously offered to the user by the service provider device;

storing, by the service provider device, the first encrypted query result on a blockchain;

sending, by the service provider device to the proxy device, the first encrypted query result, wherein the proxy device obtains a total amount of values offered to the user by the plurality of service provider devices based on processing first encrypted query results corresponding to the plurality of service provider devices based on a secret sharing (SS) method;

transmitting, to the user, a response to the query request indicating the total amount of values;

receiving, by the service provider device and from the proxy device, an audit request initiated by the user;

determining, by the service provider device and based on the audit request, a second encrypted query result corresponding to the query request; and transmitting, from the service provider device, the second encrypted query result to the proxy device, for the proxy device to generate a response to the audit request based on comparing the second encrypted query result and the first encrypted query result stored on the blockchain.

18. The system of claim 17, wherein determining the first encrypted query result based on the query request comprises:

generating, by the service provider device, a random number;

determining a first query result based on the query request;

combining the random number and the first query result to render a combined result; and performing an irreversible encryption on the combined result to generate the first encryption query result.

19. The system of claim 18, wherein after storing the first encrypted query result on the blockchain, the operations further comprise:

determining, by the service provider device, a serial number that corresponds to the query request; and establishing and storing a mapping relationship between the first encrypted query result, the random number, and the serial number.

20. The system of claim 19, wherein after storing the first encrypted query result on the blockchain, the operations further comprise:

sending a storage address of the first encrypted query result and the serial number to the proxy device, wherein the proxy device establishes and stores a mapping relationship between the storage address and the serial number.

\* \* \* \* \*